US009246959B2

(12) United States Patent
Dunn et al.

(10) Patent No.: US 9,246,959 B2
(45) Date of Patent: Jan. 26, 2016

(54) SYSTEM AND METHOD FOR LOCATION-BASED SOCIAL NETWORK FEEDS

(71) Applicant: salesforce.com, inc., San Francisco, CA (US)

(72) Inventors: Zachary J. Dunn, San Francisco, CA (US); Joseph M. Olsen, Mountain House, CA (US)

(73) Assignee: salesforce.com, inc., San Francisco, CA (US)

( * ) Notice: Subject to any disclaimer, the term of this patent is extended or adjusted under 35 U.S.C. 154(b) by 303 days.

(21) Appl. No.: 13/957,112

(22) Filed: Aug. 1, 2013

(65) Prior Publication Data

US 2014/0101250 A1 Apr. 10, 2014

Related U.S. Application Data

(60) Provisional application No. 61/711,840, filed on Oct. 10, 2012.

(51) Int. Cl.

| | |
|---|---|
| ***H04L 29/06*** | (2006.01) |
| ***G06Q 50/00*** | (2012.01) |
| ***H04W 4/02*** | (2009.01) |
| ***H04W 4/20*** | (2009.01) |

(52) U.S. Cl.

CPC .............. *H04L 65/403* (2013.01); *G06Q 50/01* (2013.01); *H04W 4/02* (2013.01); *H04W 4/206* (2013.01)

(58) Field of Classification Search

CPC ...... H04L 65/403; H04W 4/206; H04W 4/02; G06Q 50/01

See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Kim T Nguyen

(74) *Attorney, Agent, or Firm* — Dergosits & Noah LLP; Todd A. Noah

(57) ABSTRACT

Systems and methods are provided for location-based social network feeds. A system identifies a geolocation of a display device. The system identifies a first network feed and a second network feed associated with a user profile associated with the display device. The system identifies a first geolocation associated with the first network feed. The system identifies a second geolocation associated with the second network feed. The system calculates a first proximity between the first geolocation and the geolocation of the display device. The system calculates a second proximity between the second geolocation and the geolocation of the display device. The system outputs, to the display device, the first network feed based on the first proximity and the second network feed based on the second proximity.

20 Claims, 4 Drawing Sheets

(56) References Cited

U.S. PATENT DOCUMENTS

| | | | |
|---|---|---|---|
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff et al. |
| 6,216,135 | B1 | 4/2001 | Brodersen et al. |
| 6,233,617 | B1 | 5/2001 | Rothwein et al. |
| 6,236,978 | B1 | 5/2001 | Tuzhilin et al. |
| 6,266,669 | B1 | 7/2001 | Brodersen et al. |
| 6,288,717 | B1 | 9/2001 | Dunkle et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,654,032 | B1 | 11/2003 | Zhu |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,100,111 | B2 | 8/2006 | McElfresh et al. |
| 7,269,590 | B2 | 9/2007 | Hull et al. |
| 7,340,411 | B2 | 3/2008 | Cook |
| 7,356,482 | B2 | 4/2008 | Frankland et al. |
| 7,373,599 | B2 | 5/2008 | McElfresh et al. |
| 7,406,501 | B2 | 7/2008 | Szeto et al. |
| 7,412,455 | B2 | 8/2008 | Dillon |
| 7,454,509 | B2 | 11/2008 | Boulter et al. |
| 7,599,935 | B2 | 10/2009 | La Rotonda et al. |
| 7,603,331 | B2 | 10/2009 | Tuzhilin et al. |
| 7,620,655 | B2 | 11/2009 | Larsson |
| 7,644,122 | B2 | 1/2010 | Weyer et al. |
| 7,668,861 | B2 | 2/2010 | Steven |
| 7,698,160 | B2 | 4/2010 | Beaven et al. |
| 7,747,648 | B1 | 6/2010 | Kraft et al. |
| 7,779,475 | B2 | 8/2010 | Jakobson et al. |
| 7,827,208 | B2 | 11/2010 | Bosworth et al. |
| 7,851,004 | B2 | 12/2010 | Hirao et al. |
| 7,945,653 | B2 | 5/2011 | Zuckerberg et al. |
| 8,005,896 | B2 | 8/2011 | Cheah et al. |
| 8,010,663 | B2 | 8/2011 | Firminger et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven et al. |
| 8,095,594 | B2 | 1/2012 | Beaven et al. |
| 8,103,611 | B2 | 1/2012 | Tuzhilin et al. |
| 8,150,913 | B2 | 4/2012 | Cheah et al. |
| 8,209,308 | B2 | 6/2012 | Jakobson et al. |
| 8,275,836 | B2 | 9/2012 | Beaven et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2004/0001092 | A1 | 1/2004 | Rothwein et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2008/0249972 | A1 | 10/2008 | Dillon |
| 2009/0100342 | A1 | 4/2009 | Jakobson |
| 2012/0233137 | A1 | 9/2012 | Jakobson et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2014/0052613 | A1 * | 2/2014 | Tavakoli et al. ................. 705/39 |
| 2014/0082075 | A1 * | 3/2014 | Fullea Carrera et al. ..... 709/204 |
| 2014/0359537 | A1 | 12/2014 | Jackobson |
| 2015/0006289 | A1 | 1/2015 | Jakobson |
| 2015/0007050 | A1 | 1/2015 | Jakobson |
| 2015/0095162 | A1 | 4/2015 | Jakobson |
| 2015/0172563 | A1 | 6/2015 | Jakobson et al. |

* cited by examiner

Home | My Groups | Browse | Popular Groups | My Profile

Search Groups

Welcome, Nate!
View My Profile

New Messages (1)

Attach    File    Link

Show All
Care Teams
Products
Companies
Investor Relations
Add Category

200

Today August 26, 2010

Jen Harris Does anyone know what cable I need to connect to the M109S Mini Projector? —— 202
7:17 AM  Comment  Follow

Frank Chen Use the 30 Pin Multi Input cable. I should have arrived in the box with your projector.
7:00 AM  Comment  Follow

Sam Brewster Should we bring the AX932 Connectors, or will your team be bringing them? —— 204
8:00 AM  Delete

John Smith Great question. I know we will have the AX936 Connectors but I'm not sure if the two are interchangeable. I'll have to do some research on this.
8:00 AM  Delete

Sam Brewster The AX936 will actually work perfectly. We'll have a few backup just in case.
8:00 AM  Delete

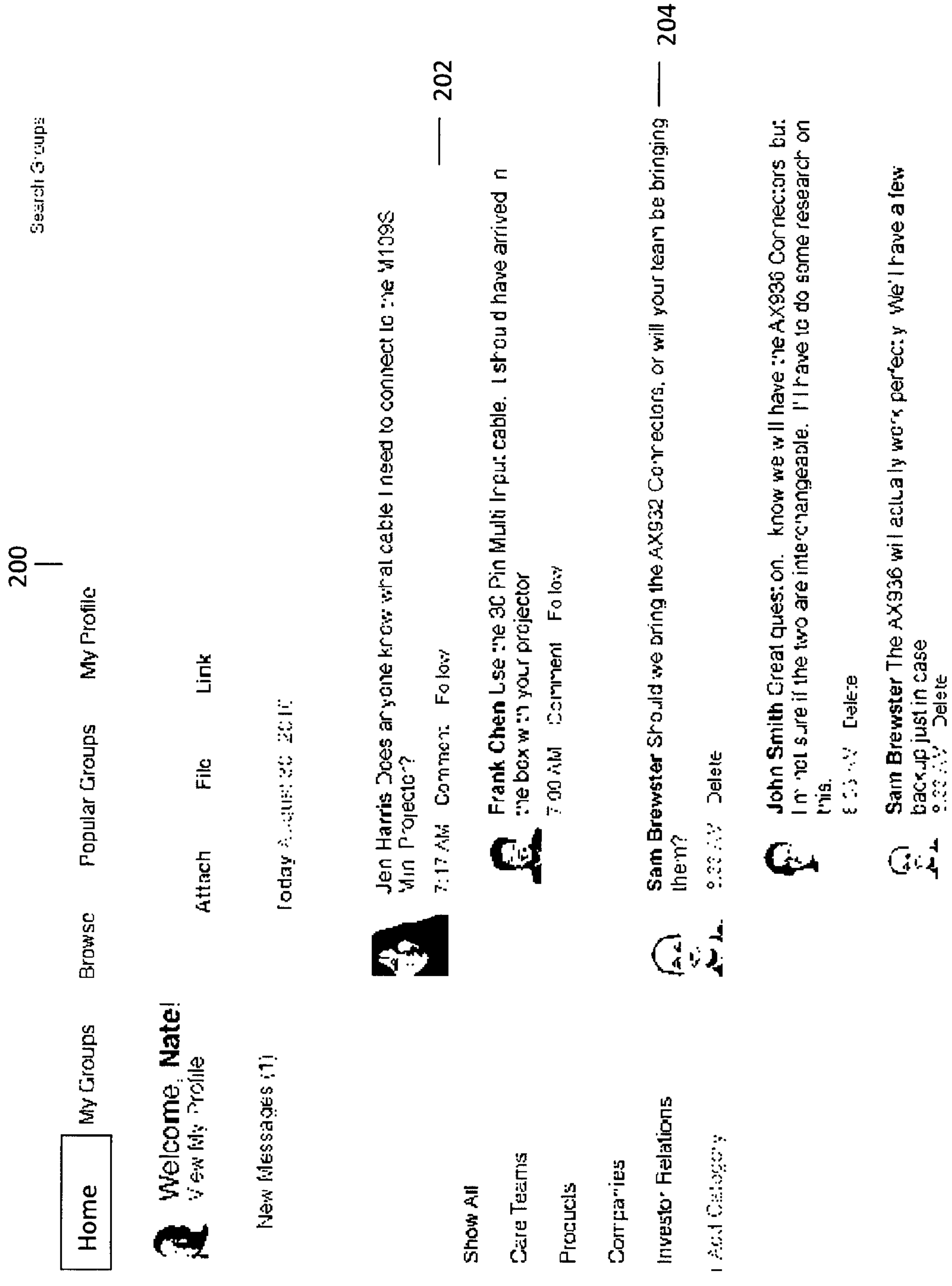

FIG. 2

SYSTEM AND METHOD FOR LOCATION-BASED SOCIAL NETWORK FEEDS

CLAIM OF PRIORITY

This application claims the benefit of U.S. Provisional Patent Application 61/711,840 entitled SYSTEM AND METHOD FOR LOCATION-BASED SOCIAL OFFERINGS, by Dunn, et al., Oct. 10, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

LOCATION-BASED SOCIAL NETWORK FEEDS

One or more implementations relate generally to location-based social network feeds.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some enterprises use computers to provide an online social network that enables real-time collaboration for their users. An online social network is a digitized representation of human interaction transmitted for a wider audience. Whereas the audience for a conventional conversation between two people may be limited to those in close audible proximity between those two people, a conversation that takes place on an online social network is not bound by such physical constraints. Any other person or user who is interested in following an online conversation may do so. An online social network sends information proactively via a real-time news stream, or network feed. Users can subscribe to follow individuals and/or groups to receive broadcast updates about various events and activities. Users can also post messages on the profiles of other members of the online social network to collaborate on various events and activities. In some implementations, an online social network may allow a user to follow data objects in the form of records such as cases, accounts, or opportunities, in addition to following individual users and groups of users. One example of such an online social network is Chatter®, provided by Salesforce.com Inc. of San Francisco, Calif. Such an online social network can be implemented in various settings, including enterprises such as business organizations or groups within such an organization. For instance, Chatter® can be used by employee users of a business organization to communicate and collaborate with each other for various purposes. Chatter® provides real-time feeds and updates on people, groups, documents, files, and other business objects such as reports and dashboards. It should be appreciated, however, that the invention can be implemented in any kind of online social network. Aspects of the invention may be implemented in connection with advertising, marketing, matchmaking, on-line dating, e-learning, e-commerce, and so forth. Accordingly, it is desirable to provide techniques that enable a database system providing an online social network to improve the performance, efficiency, and the ease of use for collaboration.

BRIEF SUMMARY

In accordance with embodiments, there are provided systems and methods for location-based social network feeds. A system identifies a geolocation of a display device. For example, the system identifies the location of Nate's mobile phone as New York City. The system identifies a first network feed and a second network feed associated with a user profile associated with the display device. For example, the system identifies a network feed from Jen, who is a contact in Nate's social network, and a network feed from Sam, who is also a contact in Nate's social network. The system identifies a first geolocation associated with the first network feed. For example, the system identifies Jen's network feed as originating from New York City. The system identifies a second geolocation associated with the second network feed. For example, the system identifies Sam's network feed as originating from San Francisco. The system calculates a first proximity between the first geolocation and the geolocation of the display device. For example, the system calculates a first proximity of zero miles based on Jen's network feed originating from the same street address in New York City where Nate's mobile phone is located. The system calculates a second proximity between the second geolocation and the geolocation of the display device. For example, the system calculates a second proximity of 2,500 miles based on Sam's network feed originating from a street address in San Francisco that is 2,500 miles from where Nate's mobile phone is located. The system outputs, to the display device, the first network feed based on the first proximity and the second network feed based on the second proximity. For example, the system outputs Jen's network feed to Nate's mobile phone with a higher priority for display than Sam's network feed because Nate's mobile phone is in New York City, where Jen's network feed originated, and 2,500 miles from where Sam's network feed originated. The system gives greater priority to social network feeds that are closer to a user's geographical location, thereby enabling such users to save time and use their social networks more efficiently by reviewing more geographically relevant network feeds before taking the time and the effort to review less geographically relevant network feeds.

While one or more implementations and techniques are described with reference to an embodiment in which location-based social network feeds is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2 is a screen shot illustrating a frame of an example user interface screen of a display device supporting methods for location-based social network feeds;

DETAILED DESCRIPTION

General Overview

Systems and methods are provided for location-based social network feeds.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for location-based social network feeds will be described with reference to example embodiments.

The following detailed description will first describe a method for location-based social network feeds.

Next, a screen shot illustrating a frame of an example user interface screen is described.

Figure 1:
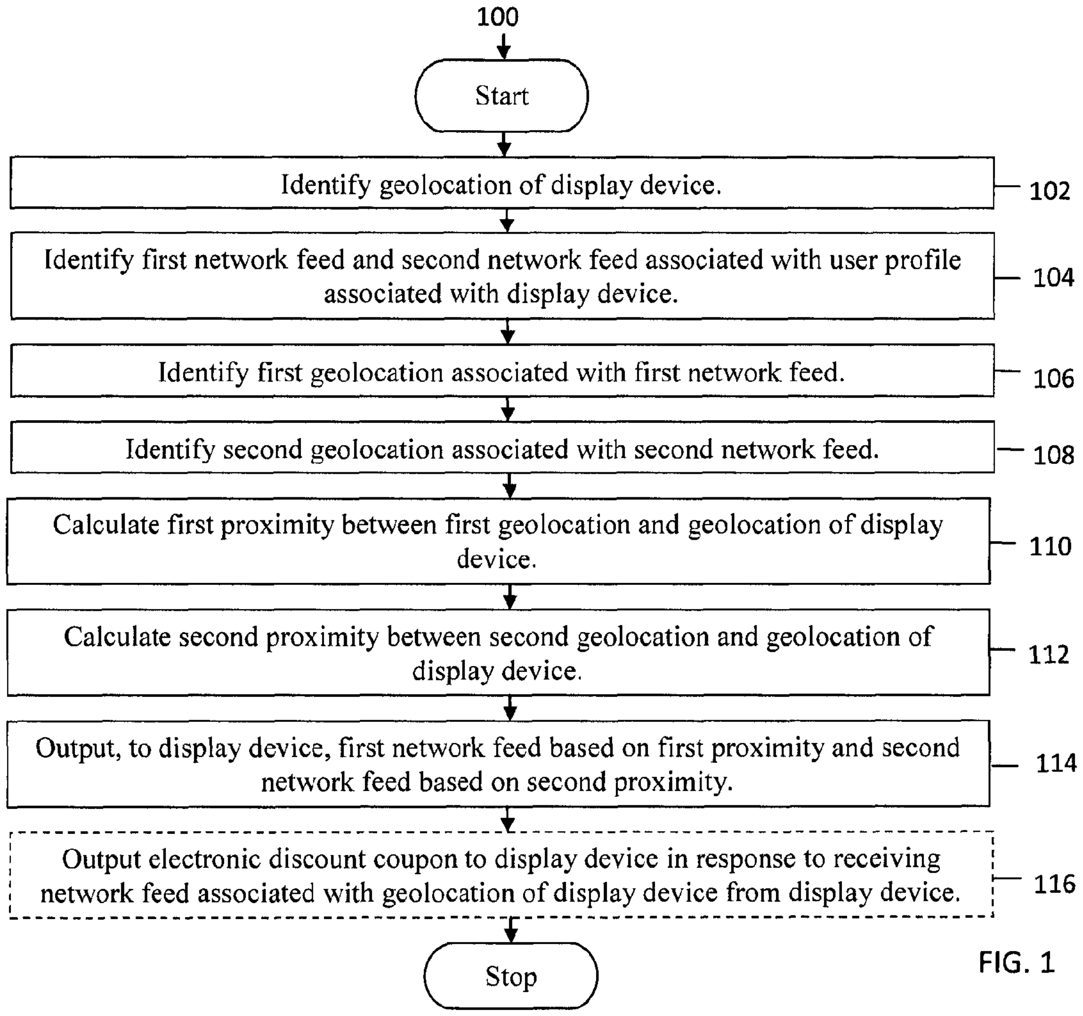
FIG. 1 is an operational flow diagram illustrating a high level overview of a method for location-based social network feeds in an embodiment.

FIG. 1 is an operational flow diagram illustrating a high level overview of a method 100 for location-based social network feeds in an embodiment. As shown in FIG. 1, a database system can give greater priority to social network feeds that are closer to a user's geographical location, thereby enabling such users to save time and use their social networks more efficiently by reviewing more geographically relevant network feeds before taking the time and the effort to review less geographically relevant network feeds.

In block 102, a geolocation is identified for a display device. For example and without limitation, this can include the database system identifying the location of Nate's mobile phone as New York City, in contrast to the location of the workstation in San Francisco that Nate normally uses. The display device may be a handheld computing device, a mobile phone, a laptop computer, a workstation, and/or a similar communication device.

In block 104, network feeds are identified for a display device's user profile. By way of example and without limitation, this can include the database system identifying a network feed from Jen, who is a contact in Nate's social network, and a network feed from Sam, who is also a contact in Nate's social network. The user profile may be associated with the geolocation of the display device, and the display device may be associated with a second user profile that is associated with a previous geolocation of the display device. For example, Nate may have created a new user profile for New York City before leaving his office in San Francisco to visit coworkers in New York City, and activated his New York City user profile upon the arrival of his flight in New York City. In this example, Nate indicated an interest in "Broadway plays" in his New York City user profile, such that the database system provides network feeds to Nate about Broadway plays, whereas the database system did not previously provide network feeds about San Francisco area plays to Nate's San Francisco user profile. In another example, Nate may have only one user profile that the database system references whether Nate is working in San Francisco or visiting New York City. Identifying network feeds may include identifying feeds based on a user selection associated with a user profile and/or a related selection associated with the user selection. For example, Nate's profile indicates an interest in professional sports teams in the San Francisco area, such that when Nate arrives in New York City, the database system determines whether any of these San Francisco area sports teams are playing any games in New York City. In another example, the database system may provide Nate with network feeds about professional sports teams based in New York City because Nate's profile indicates an interest in professional sports teams based in the San Francisco area.

In block 106, a geolocation is identified for a network feed. In embodiments, this can include the database system identifying Jen's network feed as originating from the New York City office of Nate's employer.

In block 108, a geolocation is identified for another network feed. For example and without limitation, this can include the database system identifying Sam's network feed as originating from the San Francisco headquarters of Nate's employer, where Nate usually works.

In block 110, a proximity is calculated between a feed's geolocation and a display device's geolocation. By way of example and without limitation, this can include the database system calculating a proximity of zero miles between where Jen's network feed originated in the New York City office of Nate's employer and where Nate's mobile phone is also located.

In block 112, a proximity is calculated between another feed's geolocation and a display device's geolocation. In embodiments, this can include the database system calculating a proximity of 2,500 miles between where Sam's network feed originated in the San Francisco headquarters of Nate's employer, where Nate usually works, and where Nate's mobile phone is located in New York City.

In block 114, network feeds are output to a display device based on their corresponding proximities. For example and without limitation, this can include the database system outputting Jen's network feed to Nate's mobile phone with a higher priority for display than Sam's network feed because Nate's mobile phone is in the New York City office of Nate's employer, where Jen's network feed originated, and 2,500 miles from the San Francisco headquarters of Nate's employer, where Nate usually works and where Sam's network feed originated. In this example, Nate's mobile phone displays Jen's network feed above Sam's network feed, even though Jen's network feed is older than Sam's network feed, enabling Nate to review information relevant to the office in which he is currently working before reviewing information relevant to the office in which he usually works. In contrast, a prior art social network may have displayed Sam's network feed above Jen's network feed because Sam's network feed is newer than Jen's network feed, even though Sam's network feed and the response to Sam's network feed may not be geographically relevant to Nate's current work.

Outputting the network feeds may include displaying the first network feed based on a first priority and the second network feed based on a second priority and a location compensation option. For example, Nate's employer may have an office in Indianapolis, Ind., where Nate never works, and Nate may prefer that network feeds from San Francisco have a higher priority than network feeds from Indianapolis even when Nate is in New York City, which is geographically closer to Indianapolis than to San Francisco. Outputting the network feeds may include outputting only one of multiple network feeds to the display device. For example, although the database system displays both the high priority network feeds and the low priority network feeds via Nate's workstation, the database system only sends the high priority network feeds to Nate's mobile phone. Such priority options may be configurable with differing options available for each of a user's different display devices.

In block 116, an electronic discount coupon is output to a display device in response to receiving a network feed associated with a geolocation of the display device from the display device. By way of example and without limitation, this can include the database system outputting an electronic discount coupon for a specific product to Nate's mobile phone when Nate's mobile phone is located at a trade show that sells the specific product in response to Nate using his mobile phone to post a favorable review of the specific product via a network feed. The network feed may have been received prior to the display device's arrival at the geolocation, such as before Nate arrived at the trade show, or while the display device was at the geolocation, such as when Nate is at the trade show. The provider of the electronic discount coupon may provide the electronic discount coupon independent of the content of the network feed, or dependent upon the content of the network feed. For example, the specific product's manufacturer may provide the electronic discount coupon to Nate's mobile phone to reward Nate for a favorable review of their product or to get Nate to change his mind after an unfavorable review of their product.

The database system gives greater priority to social network feeds that are closer to a user's geographical location, thereby enabling such users to save time and use their social networks more efficiently by reviewing more geographically relevant network feeds before taking the time and the effort to review less geographically relevant network feeds. The method 100 may be repeated as desired. Although this disclosure describes the blocks 102-116 executing in a particular order, the blocks 102-116 may be executed in a different order.

FIG. 2 is a screen shot illustrating a frame 200 of an example user interface screen of a display device for location-based social network feeds in an embodiment. The frame 200 may include network feeds from a first geolocation 202 and network feeds from a second geolocation 204. A user homepage depicted by the frame 200 enables the user to review the network feeds from multiple geolocations based on their associated priorities and proximities. Although this simplified example depicts only one network feed and one response from New York City 202, and only one network feed, one response, and one reply to the response from San Francisco 204, actual user interface screens may typically display dozens of network feeds, such that giving greater priority to social network feeds that are closer to a user's geographical location may enable such users to save a significant amount of time and use their social networks more efficiently by reviewing more geographically relevant network feeds before taking the time and the effort to scroll through dozens of less geographically relevant network feeds. The user homepage also enables the user to respond to network feeds and to generate original network feeds for any of the geolocations. Furthermore, the user homepage enables the user to search network feeds from the geolocations based on user-specified criteria.

The frame 200 may be part of a larger display screen that includes fields for users to enter commands to create, retrieve, edit, and store records. The database system may output a display screen that includes the frame 200 in response to a search based on search criteria input via a user interface. Because the frame 200 is a sample, the frame 200 could vary greatly in appearance. For example, the relative sizes and positioning of the text is not important to the practice of the present disclosure. The frame 200 can be depicted by any visual display, but is preferably depicted by a computer screen. The frame 200 could also be output as a report and printed or saved in electronic format, such as PDF. The frame 200 can be part of a personal computer system and/or a network, and operated from system data received by the network, and/or on the Internet. The frame 200 may be navigable by a user. Typically, a user can employ a touch screen input or a mouse input device to point-and-click to a location on the frame 200 to manage the text on the frame 200, such as a selection that enables a user to edit the text. Alternately, a user can employ directional indicators, or other input devices such as a keyboard. The text depicted by the frame 200 is an example, as the frame 200 may include a much greater amount of text. The frame 200 may also include fields in which a user can input textual information.

System Overview

Figure 3:
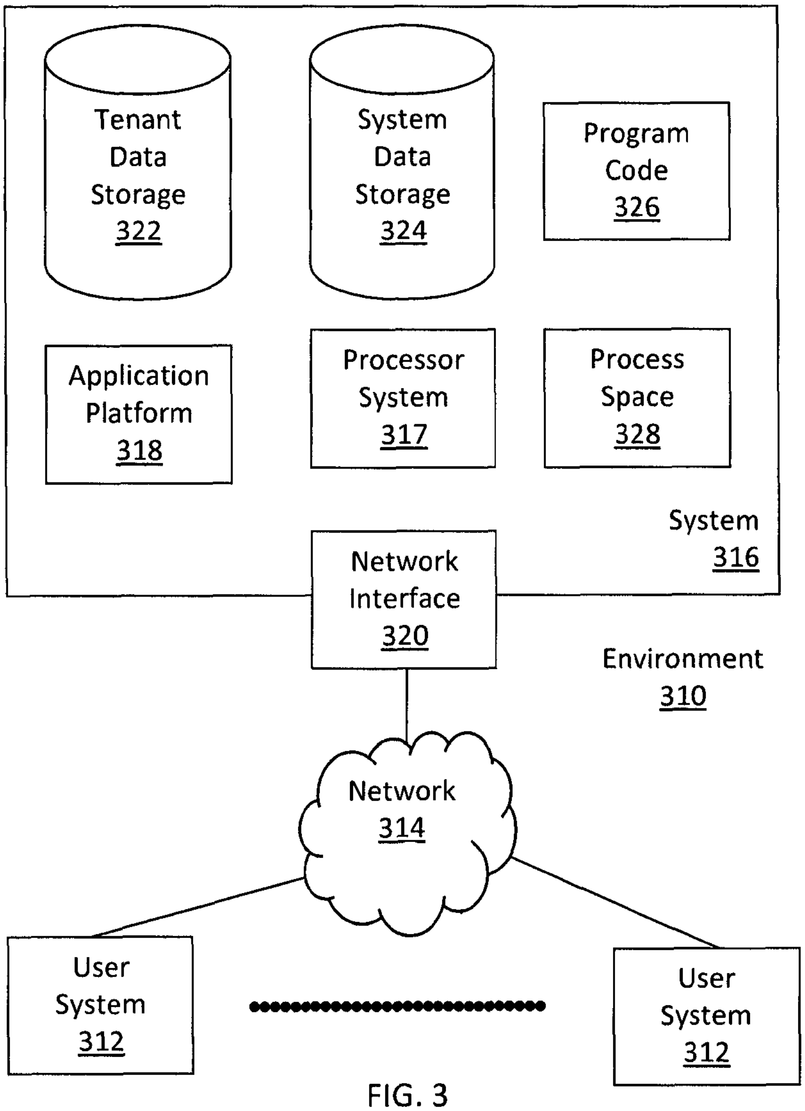
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314.

Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein.

Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
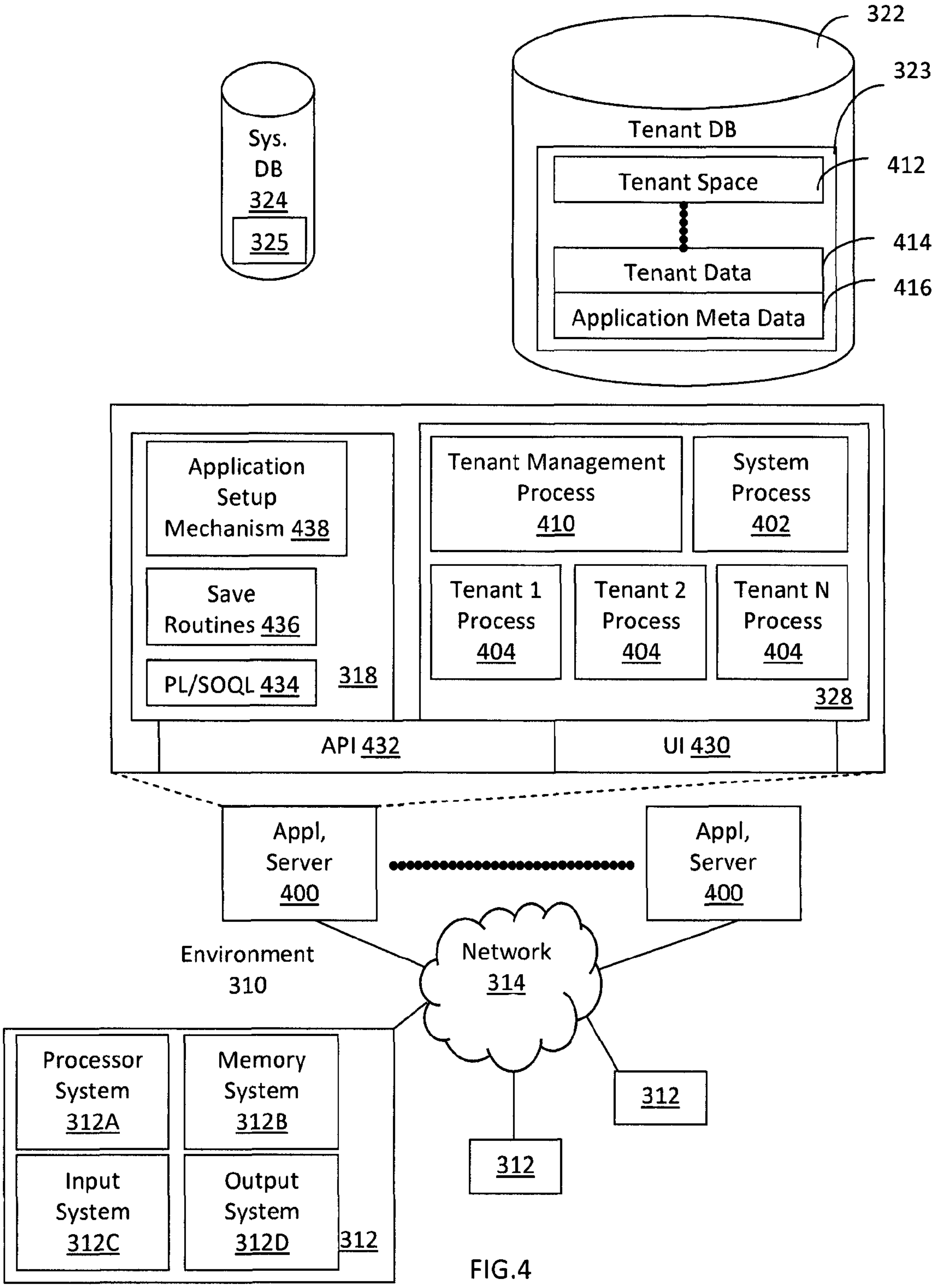
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $\mathbf{400}_1$ might be coupled via the network 314 (e.g., the Internet), another application server $\mathbf{400}_{N-1}$ might be coupled via a direct network link, and another application server $\mathbf{400}_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for location-based social network feeds, the apparatus comprising:

a processor; and a non-transitory machine readable medium storing one or more sequences of instructions which, when executed by the processor, cause the processor to:

identify a geolocation of a display device;

identify a first network feed and a second network feed associated with a user profile associated with the display device;

identify a first geolocation associated with the first network feed;

identify a second geolocation associated with the second network feed;

calculate a first proximity between the first geolocation and the geolocation of the display device;

calculate a second proximity between the second geolocation and the geolocation of the display device; and output, to the display device, the first network feed based on the first proximity and the second network feed based on the second proximity.

2. The apparatus of claim 1, wherein identifying the first network feed and the second network feed comprises identifying feeds based on at least one of a user selection associated with the user profile and a related selection associated with the user selection.

3. The apparatus of claim 1, wherein the user profile is associated with the geolocation of the display device, and the display device is also associated with a second user profile that is associated with a previous geolocation of the display device.

4. The apparatus of claim 1, wherein outputting, to the display device, the first network feed based on the first proximity and the second network feed based on the second proximity comprises at least one of displaying the first network feed based on a first priority and the second network feed based on at least one of a second priority and a location compensation option, and outputting only one of the first network feed and the second network feed to the display device.

5. The apparatus of claim 1, wherein the instructions, when executed by the processor, will further cause the processor to output an electronic discount coupon to the display device in response to receiving a network feed associated with the geolocation of the display device from the display device.

6. A non-transitory machine-readable medium carrying one or more sequences of instructions for location-based social network feeds, which instructions, when executed by one or more processors, cause the one or more processors to carry out the steps of:

identifying a geolocation of a display device;

identifying a first network feed and a second network feed associated with a user profile associated with the display device;

identifying a first geolocation associated with the first network feed;

identifying a second geolocation associated with the second network feed;

calculating a first proximity between the first geolocation and the geolocation of the display device;

calculating a second proximity between the second geolocation and the geolocation of the display device; and outputting, to the display device, the first network feed based on the first proximity and the second network feed based on the second proximity.

7. The non-transitory machine-readable medium of claim 6, wherein identifying the first network feed and the second network feed comprises identifying feeds based on at least one of a user selection associated with the user profile and a related selection associated with the user selection.

8. The non-transitory machine-readable medium of claim 6, wherein the user profile is associated with the geolocation of the display device, and the display device is also associated with a second user profile that is associated with a previous geolocation of the display device.

9. The non-transitory machine-readable medium of claim 6, wherein outputting, to the display device, the first network feed based on the first proximity and the second network feed based on the second proximity comprises at least one of displaying the first network feed based on a first priority and the second network feed based at least one of a second priority and a location compensation option, and outputting only one of the first network feed and the second network feed to the display device.

10. The non-transitory machine-readable medium of claim 6, further comprising the steps of outputting an electronic discount coupon to the display device in response to receiving a network feed associated with the geolocation of the display device from the display device.

11. A method for location-based social network feeds, the method comprising:

identifying, by a computing device, a geolocation of a display device;

identifying, by the computing device, a first network feed and a second network feed associated with a user profile associated with the display device;

identifying, by the computing device, a first geolocation associated with the first network feed;

identifying, by the computing device, a second geolocation associated with the second network feed;

calculating, by the computing device, a first proximity between the first geolocation and the geolocation of the display device;

calculating, by the computing device, a second proximity associated with the second geolocation relative to the geolocation of the display device; and outputting, by the computing device to the display device, the first network feed based on the first proximity and the second network feed based on the second proximity.

12. The method of claim 11, wherein identifying the first network feed and the second network feed comprises identifying feeds based on at least one of a user selection associated with the user profile and a related selection associated with the user selection.

13. The method of claim 11, wherein the user profile is associated with the geolocation of the display device, and the display device is also associated with a second user profile that is associated with a previous geolocation of the display device.

14. The method of claim 11, wherein outputting, to the display device, the first network feed based on the first proximity and the second network feed based on the second proximity comprises at least one of displaying the first network feed based on a first priority and the second network feed based on at least one of a second priority and a location compensation option, and outputting only one of the first network feed and the second network feed to the display device.

15. The method of claim 11, the method further comprising outputting an electronic discount coupon, by the computing device, to the display device in response to receiving a network feed associated with the geolocation of the display device from the display device.

16. A system for location-based social network feeds, the system comprising:

a processor-based application stored on a non-transitory machine-readable medium, executed on a computer, and configured to:

identify a geolocation of a display device;

identify a first network feed and a second network feed associated with a user profile associated with the display device;

identify a first geolocation associated with the first network feed;

identify a second geolocation associated with the second network feed;

calculate a first proximity between the first geolocation and the geolocation of the display device;

calculate a second proximity associated with the second geolocation relative to the geolocation of the display device; and output, to the display device, the first network feed based on the first proximity and the second network feed based on the second proximity.

17. The system of claim 16, wherein identifying the first network feed and the second network feed comprises identifying feeds based on at least one of a user selection associated with the user profile and a related selection associated with the user selection.

18. The system of claim 16, wherein the user profile is associated with the geolocation of the display device, and the display device is also associated with a second user profile that is associated with a previous geolocation of the display device.

19. The system of claim 16, wherein outputting, to the display device, the first network feed based on the first proximity and the second network feed based on the second proximity comprises at least one of displaying the first network feed based on a first priority and the second network feed based on at least one of a second priority and a location compensation option, and outputting only one of the first network feed and the second network feed to the display device.

20. The system of claim 16, the processor-based application further configured to output an electronic discount coupon to the display device in response to receiving a network feed associated with the geolocation of the display device from the display device.

* * * * *